June 7, 1938.  J. M. G. FULLMAN  2,119,782
ELECTRICAL COVER ATTACHMENT
Filed May 4, 1936
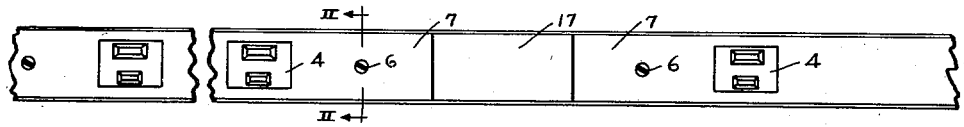
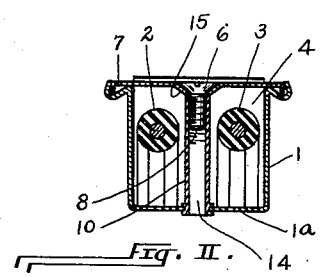
Fig. II.
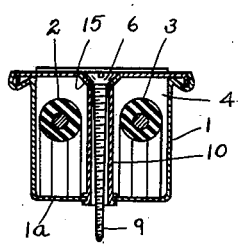
Fig. III.
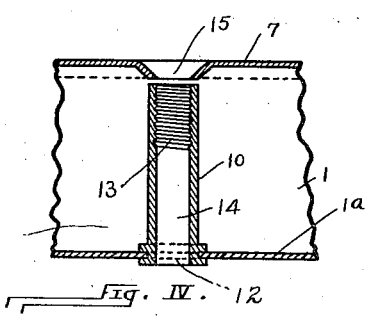
Fig. IV.
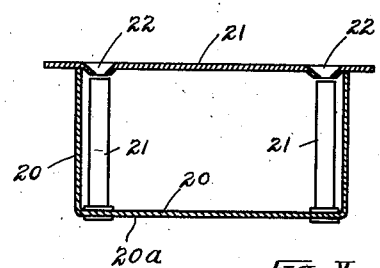
Fig. V.
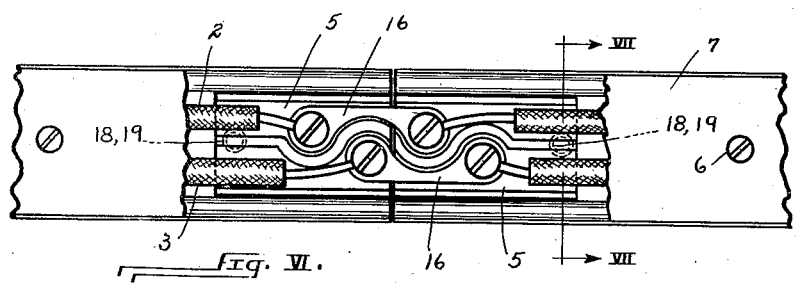
Fig. VI.
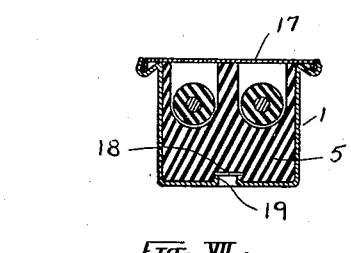
Fig. VII.
INVENTOR
James M. G. Fullman
BY Christy and Wharton
ATTORNEYS Patented June 7, 1938

2,119,782

UNITED STATES PATENT OFFICE 2,119,782

ELECTRICAL COVER ATTACHMENT

James M. G. Fullman, Sewickley, Pa., assignor to National Electric Products Corporation, a corporation of Delaware Application May 4, 1936, Serial No. 77,828

4 Claims. (Cl. 247—37)

This invention relates to cover-attaching means for outlet boxes and other electrical devices, and particularly to means for attaching a cover to the housing portion of elongate multiple outlet receptacles of the type usually known as outlet ducts or plug-in strips.

In multiple outlet ducts it is desirable that the cover element which is applied to the housing element of the duct containing conductors, contact members, and contact mountings be mechanically connected to the channel element. A resilient engagement between the cover element of the assembly and the housing element of the assembly, particularly when the unit is long and the cover is in the form of an elongate strip of relatively light-gauge metal or other flexible material, is not sufficiently firm to give to the structure an effect of solidarity when contact plugs are inserted and withdrawn. Particularly in withdrawing contact prongs there is a tendency to pull the mounting elements for the contacts outwardly against the duct cover because of the frictional engagement between the contact prongs and contact elements within the duct. A rigid mechanical interengagement between the housing element of the duct and the cover strip of the duct goes far in reducing bulging of the cover strip during the making or breaking of outlet connections from the duct, and positively prevents accidental dislodgment of the cover.

It is also desirable that the assembly as a whole have positive closely spaced connections with a body which the base of the duct contacts, as such positive connection prevents springing movement of the duct as a whole when making or breaking outlet connection with it.

A serious difficulty in extending connecting means into, or through, the depth of the channel in such ducts is found in the fact that screw threads and other sharp edges tend to cut the insulation on conductors housed within the channel element of the duct and thereby create danger of short-circuiting.

With these problems in mind, I have invented an attachment of particular utility in connection with the elongate devices known as outlet ducts or plug-in strips, and also useful in connection with outlet boxes and other devices, by means of which the cover strip of the duct may be mechanically connected with the housing element of the duct, and by means of which the duct as a whole also may be rigidly attached to a body which its base contacts. This attachment is of such form that it does not present interiorly of the duct screw threads or other cutting or wearing edges.

In the accompanying drawing Fig. I is a fragmentary plan view of a multiple outlet duct, or plug-in strip, illustrating a relatively close spacing of cover-attaching means longitudinally of the duct.

Fig. II is a cross-sectional view taken on the plane II—II of Fig. I, but showing the duct on an enlarged scale, and illustrating the attachment of a cover strip to the housing element of the duct.

Fig. III is a similar view, but illustrating unitary means providing both connection of the cover strip to the housing element of the duct and attachment of the duct as a whole to an underlying body.

Fig. IV is a fragmentary, vertical, sectional view of a duct region, illustrating in detail the primary elements of the interconnecting and attaching means.

Fig. V is a vertical, sectional view through an outlet box of otherwise unspecialized form, showing it provided with the primary elements of the means for attaching a cover to the box and for securing the outlet box in mounted position.

Fig. VI is a fragmentary, plan view of the multiple outlet duct in a region of electrical interconnection between abutted duct lengths, the cover being broken away to show the means for electrically interconnecting the adjacent lengths of duct.

Fig. VII is a cross-sectional view, taken on the plane VII—VII of Fig. VI, and showing means arranged positively to position the electrical interconnecting means definitely at the terminal edge of a length of duct.

In the accompanying drawing reference numeral 1 designates the elongate, metallic housing element of a multiple outlet duct or plug-in strip, which housing element forms a channel to house the electrical conductors 2 and 3, the receptacle elements 4 of insulating material, and the insulating connector blocks 5 for making electrical connection between abutted lengths of duct. Referring to Fig. I of the drawing, it will be observed that screw heads 6 appear at relatively short intervals on the outer face of the lengths 7 of cover strip by which the channel of the housing element is enclosed. In my attaching organization, these screw heads 6 may be either the heads of machine screws 8, as shown in Fig. II, or may be the heads of wood screws 9, as shown in Fig. III.

Referring particularly to Figs. II and III of the drawing, it will be seen that a tubular post, or sleeve, 10 is mounted on the base 1a of the housing to extend perpendicularly from the base and within the channel provided by it. As shown in the drawing, the attachment of tubular post, or sleeve, 10 is effected by riveting the base 11 of the sleeve at an opening 12 through the base 1a of the housing. Attachment of the sleeve 10 to the base of the housing may obviously be made by welding, or in any other suitable manner. Sleeve 10 is interiorly threaded in a region 13 which may extend downwardly through any desired proportion of the sleeve height, and the bore 14 of the sleeve is in alignment with an opening 15 through the duct strip 7. Desirably, the metal of the cover is inwardly deflected adjacent the opening 15, as shown, to provide a countersunk seat for receiving a screw head 6.

In making initial assembly of the duct, cover strips 7 are so positioned on the housing 1 that the openings 15 of the cover strips are in vertical alignment with the threaded bores 14 of the several tubular posts, or sleeves, 10. By insertion of the machine screws 8 through the openings 15 to make threaded engagement with the interiorly threaded regions 13 of the several sleeves, the cover strip, or strips, 7 are firmly attached to the housing 1 of the assembly. It will be noted that, with the conductors 2 and 3 lying in the channel of the duct on opposite sides of the sleeves 10, the insulation of the conductors comes into contact only with the smooth circular exterior surface of the sleeves, being wholly shielded by the sleeves from contact with the threads of the screws 8.

When the duct is so installed that it is adequately engaged by clamping or cementing it in position in a wall or other structure in which the duct is mounted, the machine screws 8 may be retained for securing the cover strips 7 to the housing 1 of the duct. When so retained for engaging the cover strip to the housing element, it is of advantage that the sleeves 10 provide relatively extended threaded engagement with the machine screws, thus insuring that the screws will not work loose after installation of the duct. When, however, no special duct-engaging means are provided in the structure in which the duct is mounted, it is expedient to remove the machine screws 8, and to replace them by attaching means such as the elongate wood screws 9, shown in Fig. III of the drawing. As shown in Fig. III, the heads 6 of elongate wood screws 9 lie in the countersunk openings 15 of the cover, and the screw shanks, extending throughout the length of sleeve bores 14 and through the openings 12 in the base of the housing, may enter a body against which the base of the housing lies to engage the duct as a whole to it. It is not necessary that wood screw 9 have threaded engagement with the interiorly threaded region 13 of the sleeve, since the screw in the absence of such threaded cooperation none the less engages the housing to the underlying structure and holds the cover strip firmly to the housing. As the duct is so mounted to an abutting body, toggle bolts, or even nails, may be used instead of the wood screws shown in the drawing.

As duct lengths are made up at the factory, the cover strip for each length is thus rigidly attached to the housing. In order that terminal connection may be made between lengths of duct which are in end abutment with each other without removing the cover, the cover strips desirably terminate short of the housing ends. Electrical interconnection may then be made between the conductors 2 and 3 of the abutting duct lengths, as by means of terminal blocks 5 and conducting bars 16. When electrical interconnection between duct lengths has been made, the channel of the duct in the interval between cover strips may be enclosed by a short cover member 17 resiliently engaging with the housing in the region of electrical interconnection. The initial mechanical engagement of the cover strips to the lengths of housing does not, therefore, cause installation difficulties. The terminal blocks 5 thus facilitating interconnection between duct lengths desirably may be locked in position by means of indentations 18 in the lower surface of the blocks engaging bosses 19 on the base 1a of the housing.

The use of my cover attachment in an outlet box of unspecialized type is illustrated in Fig. V of the drawing. As there shown, the housing element 20 of the outlet box has mounted therein tubular posts, or sleeves, 21, identical with the sleeves shown in the preceding figures of the drawing, and identically mounted on the base 20a of the outlet box. The cover 21 of the outlet box similarly is provided with countersunk seats 22 terminating in openings vertically aligned with the bores of the sleeves 21.

An outlet box so provided with my connecting and attaching means may, as assembled for sale, have the cover attached to the housing element of the outlet box by a machine screw, or the like, cooperating with interiorly threaded regions of the sleeve. In installation, such machine screws may, if desired, similarly be replaced by wood screws, toggle bolts, nails, or the like, by means of which the outlet box assembly is attached to a body against which the base 20a of the outlet box rests. Whatever attaching means be projected through the bores of the sleeves 21, and through the openings in the base of the outlet box, conductors within the outlet box are protected from injurious contacts by the smooth exterior surface of the sleeves.

I claim as my invention:

1. In an electrical multiple outlet duct comprising an elongate housing having a base and side walls and a cover strip adapted to be supported by the side walls of the housing to enclose the elongate housing channel, and a conductive assembly housed in the channel of the housing and comprising elongate insulated conductors, contact elements in electrical contact with the conductors, and insulating blocks providing mounting for the contacts and conductors; a plurality of tubular posts in longitudinally spaced arrangement in the intervals between insulating blocks and projected perpendicularly from the base of the housing, said tubular posts being each interiorly threaded and formed to present smooth non-abrasive surface to the elongate conductors in the housing channel, and longitudinally spaced openings for the insertion of connecting members through the cover in vertical alignment each with the bore of one of the tubular posts.

2. In an electrical device comprising a housing element having a base and side walls and a cover adapted to be supported by the side walls of the housing to enclose the cavity of the housing; a tubular post extended perpendicularly from the base of the housing, and cooperative openings in the base of the housing element and in the cover adapted to be supported by the side walls of the housing, said openings being both in vertical alignment with the bore of the tubular post;

whereby fastening means may be extended through the opening in the cover and through the post to project outwardly beyond the base of the housing.

3. In an electrical device comprising a housing element having a base and side walls and a cover adapted to enclose the cavity of the housing; a tubular post extended perpendicularly to the base of the housing, and cooperative openings in the base of the housing element and in the cover both in vertical alignment with the bore of the tubular post.

4. In an electrical multiple outlet duct comprising an elongate housing having a base and side walls and a cover strip adapted to provide a closure for the cavity of the housing, and a conductive assembly housed in the channel of the housing and comprising elongate insulated conductors, contact elements in electrical contact with the conductors and insulating means providing mounting for the contacts and conductors; a plurality of tubular posts in longitudinally spaced arrangement in the said housing and projected perpendicularly from the base of the housing said tubular posts being interiorly threaded and formed to present a smooth non-abrasive exterior surface interiorly of the housing, and longitudinally spaced openings for the insertion of connecting members through the cover in vertical alignment with the bore of one of the tubular posts.

JAMES M. G. FULLMAN.